United States Patent [19]
Liebl et al.

[11] Patent Number: 6,158,006
[45] Date of Patent: Dec. 5, 2000

[54] METHOD FOR THE COORDINATION OF PARALLEL ACCESSES OF A PLURALITY OF PROCESSORS TO RESOURCE CONFIGURATIONS

[75] Inventors: Robert Liebl, Lohberg; Wolfgang Pfaehler, Dachau, both of Germany

[73] Assignee: Siemens Aktiengesellschaft, Munich, Germany

[21] Appl. No.: 08/272,590

[22] Filed: Jul. 11, 1994

[30] Foreign Application Priority Data

Jul. 16, 1993 [DE] Germany ............... 43 23 931

[51] Int. Cl.[7] ........................... G06F 11/30
[52] U.S. Cl. ........................ 713/201; 713/200
[58] Field of Search ................. 395/575, 725, 395/186, 187.01, 185.01; 364/222.5; 380/4, 30; 713/200, 201

[56] References Cited

U.S. PATENT DOCUMENTS

| | | | |
|---|---|---|---|
| 4,654,778 | 3/1987 | Chiesa et al. | 364/200 |
| 5,001,628 | 3/1991 | Johnson et al. | 364/200 |
| 5,305,385 | 4/1994 | Schaning et al. | 380/49 |
| 5,321,841 | 6/1994 | East et al. | 395/725 |
| 5,339,443 | 8/1994 | Lockwood | 395/725 |
| 5,402,490 | 3/1995 | Mihm, Jr. | 380/21 |

*Primary Examiner*—Norman M. Wright
*Attorney, Agent, or Firm*—Hill & Simpson

[57] ABSTRACT

Complex resource configurations often exist in multiprocessor systems. As a result thereof, coordination problems arise given competing accesses to a specific resource configuration by a plurality of processors. In a method for the coordination of parallel accesses of a plurality of processors to resource configurations a central security table is introduced. A processor must deposit its processor number thereat for a specific security number if the processor is to receive control over the resource configuration belonging to this security number.

6 Claims, 3 Drawing Sheets

METHOD FOR THE COORDINATION OF PARALLEL ACCESSES OF A PLURALITY OF PROCESSORS TO RESOURCE CONFIGURATIONS

BACKGROUND OF THE INVENTION

Complex relationships between different systems resources often exist in multiprocessor computer systems. These system resources are not always of the same logical type and are also not always linked to one another by simple index or pointer references. The reference between the resources, by contrast, only derives dynamically during the course of an event processing. In particular, the reference can only derive after parts of such a resource configuration have already been manipulated in terms of data systems technology.

The memory programmed switching system can be considered as an example of a multiprocessor computer system, this, for example, containing channel registers and transaction control blocks as resources. Channel registers thereby represent the image of a physical path through the switching systems (conversation data), whereas transaction control blocks represent the logical images of conversation-free actions. Linkages can exist both between a plurality of channel registers or, respectively, a plurality of transaction control blocks as well as between channel registers and transaction blocks. In mobile radio telephone services, logical operations of up to four channel registers with up to 42 transaction control blocks simultaneously are known.

SUMMARY OF THE INVENTION

It is an object of the present invention to consistently undertake and to mutually coordinate (reading and writing) accesses to resource configurations that compete in a multiprocessor environment.

This object is achieved by a method of the present invention for coordination of parallel accesses of a plurality of processors to resource configurations. Each resource is protected by a security number, whereby resources that belong to a common resource configuration also receive the same security number. All security numbers are allocated via a central security table. The access control is assigned on demand to a processor over an entire resource configuration when the security number belonging to this resource configuration has not been seized at this point in time by a different processor.

Due to the central assignment of the control of a resource configuration to one processor as a consequence of an event (message), accesses of further processors to the resource configuration are avoided during the entire message processing by the one processor. As a result thereof, inconsistent accesses to the resource configuration are avoided.

In a further development of the present invention, existing security numbers are cyclically allocated. As a result there is no loss of dynamics since no extra protection mechanism is required for a more complex security number administration (pointer administration).

In a further development of the present invention the procedure of securing a resource is implemented by a central service request of the user system, and message processings are implemented by message-associated user requests of the user system. This development has the particular advantage that a message-associated user request requires no knowledge of the actual protection method.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENT

The realization of the method of the present invention is based on a central security table via which the security numbers are allocated. Only a single respective security number is allocated per resource configuration.

Before a processor accesses a resource identified with a security number, it attempts to deposit its processor number in the central security table before the access. When it succeeds in depositing its processor number, it then has complete control over all resources identified with the same security number.

Figure 1:
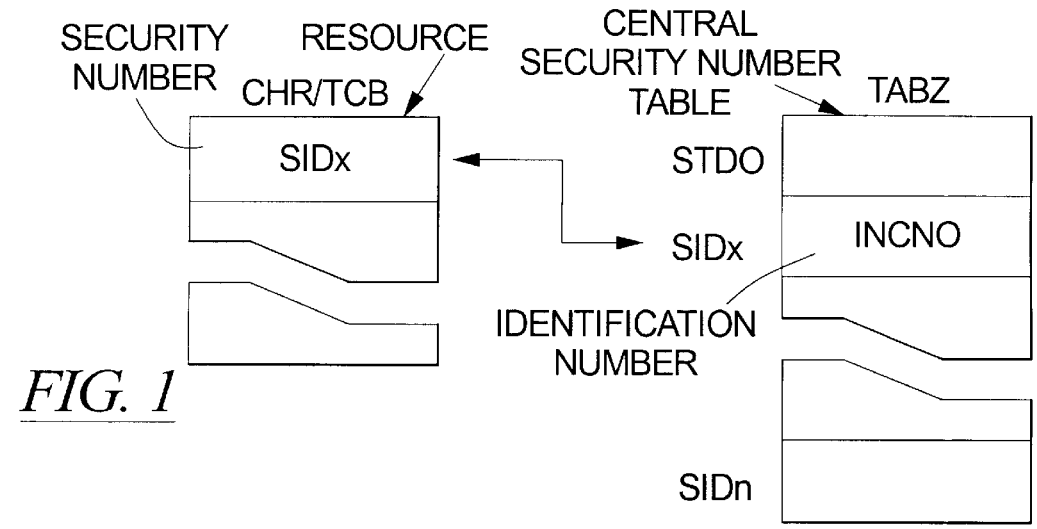
FIG. 1 depicts the allocating of a security number of a control security table to a resource.

FIG. 1 shows the allocated of a security number SIDx of a central security table TABZ to a resource CHR/TCB which, for example, can be a matter of a channel register CHR or a matter of a transaction control block TCB. When, at the beginning of a connection or, respectively, transaction by the user (user program system), a resource is seized from the resource pool, a security number must first be allocated. This security number must also be secured by the processor of the user by depositing an identification number INCNO of the user before this security number can be entered in the seized resource. At the same time, the security number is entered at the first location in the processor-associated table and thus becomes what is referred as the current security number. When further resources are then connected in, the current security number continues to be correspondingly employed. As a result thereof, all logically linked resources have a common security number and even more extensive resource configurations (see FIG. 2) can thus be secured against unallowed accesses with only one entry.

The identification number of the user corresponds to the processor number when the user program system of a processor is realized by only a single identification, for example, a single process administered by the operating system. In the following, the term "processor number" will therefore also be used for the term "identification number" and is equivalent therewith.

Figure 2:
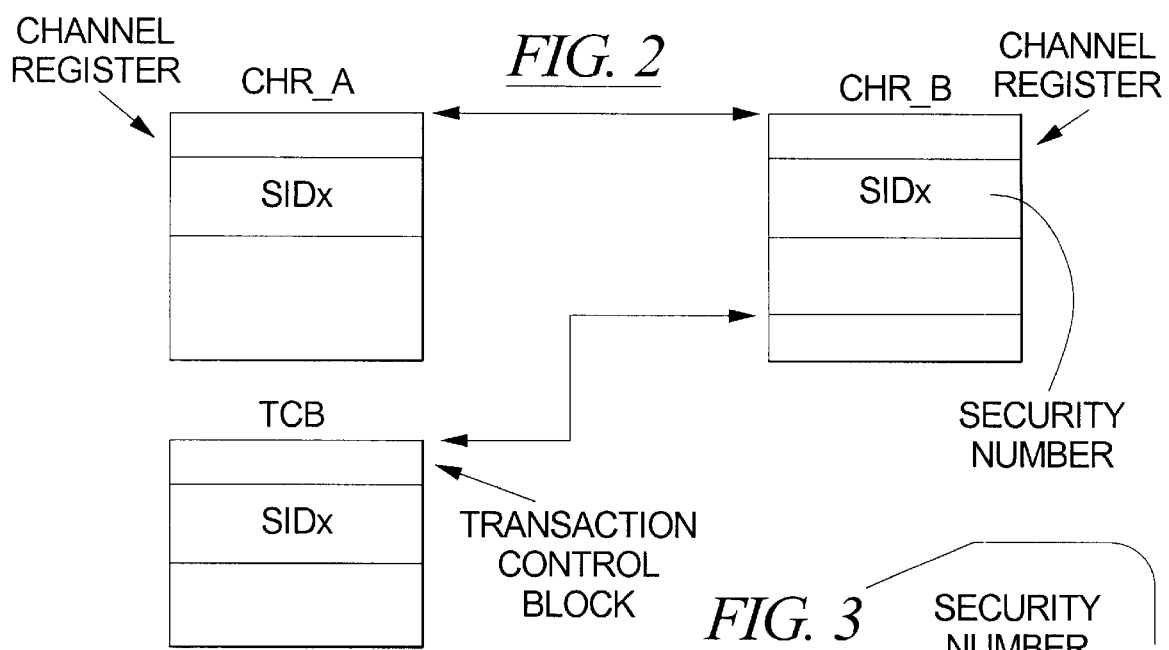
FIG. 2 depicts the protecting of a resource configuration with a common security number.

FIG. 2 shows the providing of a resource configuration with a common security number.

The allocation of the security numbers ensues cyclically. When, thus, a security number from the security table is allocated, the pointer is set to the next table location. When the end of the table is reached, the pointer is again set to the start of the table. An attempt is made with the allocated security number to enter the identification number of the processor in the corresponding table location of the security table with a specific command. When another identification number has already been entered with respect to this security number and this security number is thus secured (busy), the pointer administration simply allocates the next security number of the security table. No special protective mechanism and, thus, no particular dynamics outlay is required for the pointer administration with the cyclical allocation.

The cyclical allocating provides the possibility that the same security number is allocated repeatedly and, thus, for connections or, respectively, transactions that are independent of one another. This, however, has only slight disadvantages. Events for these different resource configurations having the same security number would then not be processed in parallel but sequentially due to the security number that can be seized by only a respective single user at a specific point in time. These requests can be kept negligibly low on the basis of a correspondingly dimensioned table.

When existing resource configurations, which inventively have their own security numbers, are logically linked to one another, all resources must have the same security number after the linkage. To that end, the security number is correspondingly transcribed at the appertaining locations. At this point in time, of course, all participating security numbers must be secured by the same processor, that is the identification number of the processor must be entered in the security table with respect to the old security numbers and the new security number.

A processor always attempts to enter its identification number in the security table as soon as it can identify the resource and, thus, the security number as well that is linked to a message allocated to it. When the processor ends the processing, the identification number is in turn removed from the security table. To that end, each processor notes all security numbers that had been secured by it within the framework of a message processing in a table of its local memory in order to have them in turn unsecured at the end of the processing by a central service request of the user, for example a central procedure.

A security number remains valid in a resource during the entire transient life span thereof. When the resource is in turn released, for example, is no longer required for the connection, the security number can also be simultaneously removed from this resource.

Figure 3:
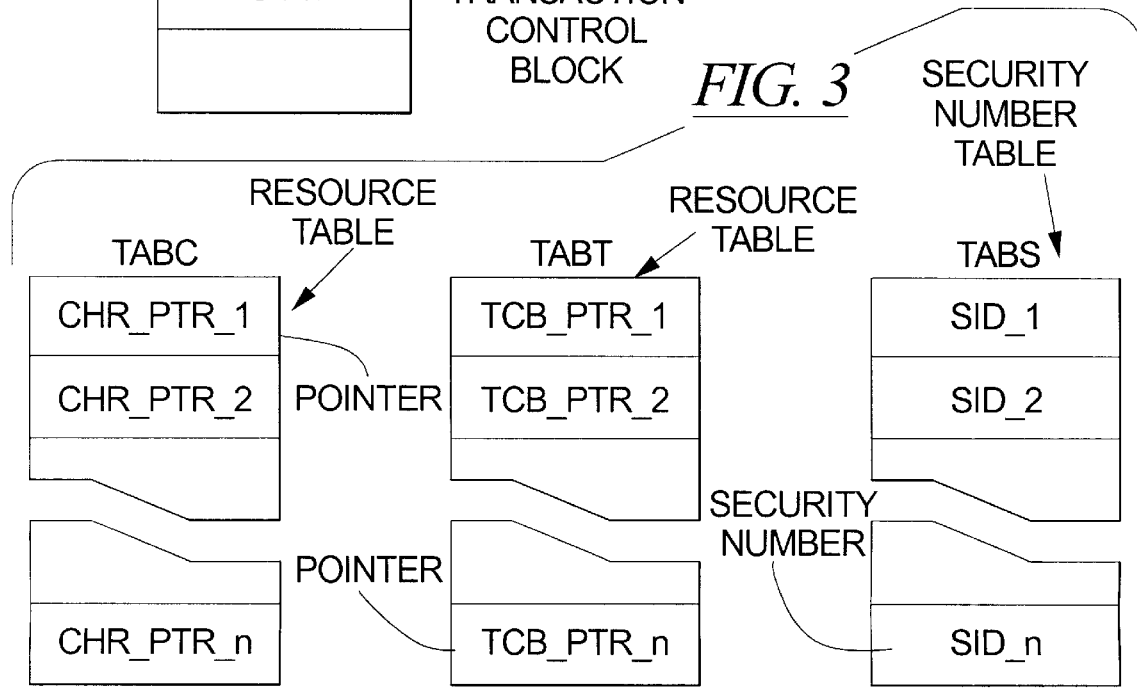
FIG. 3 depicts processor-associated tables for use in the method of the present invention.

FIG. 3 shows the processor-associated tables for the realization of the method of the invention which are reflectively present in the local memory of a processor, namely a local security number table TABS into which are entered the security numbers secured by a processor, as well as resource tables TABC and TABT in which are contained pointers CHR-PTR and TCB-PTR to resources secured by this processor.

Figure 4:
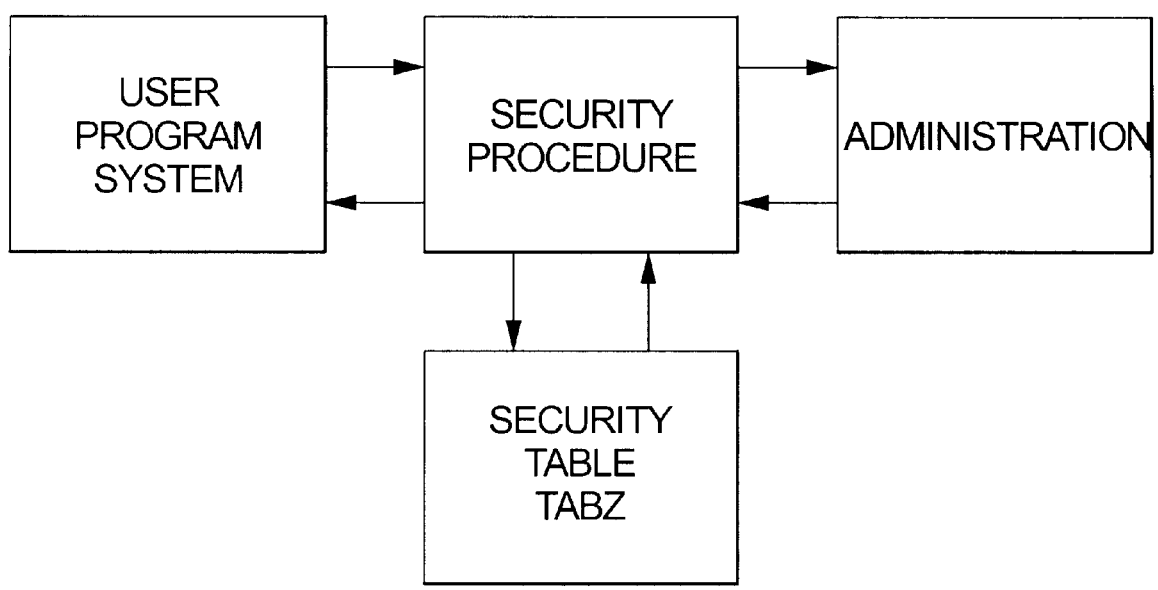
FIG. 4 is a block diagram depicting the present invention.
Figure 5:
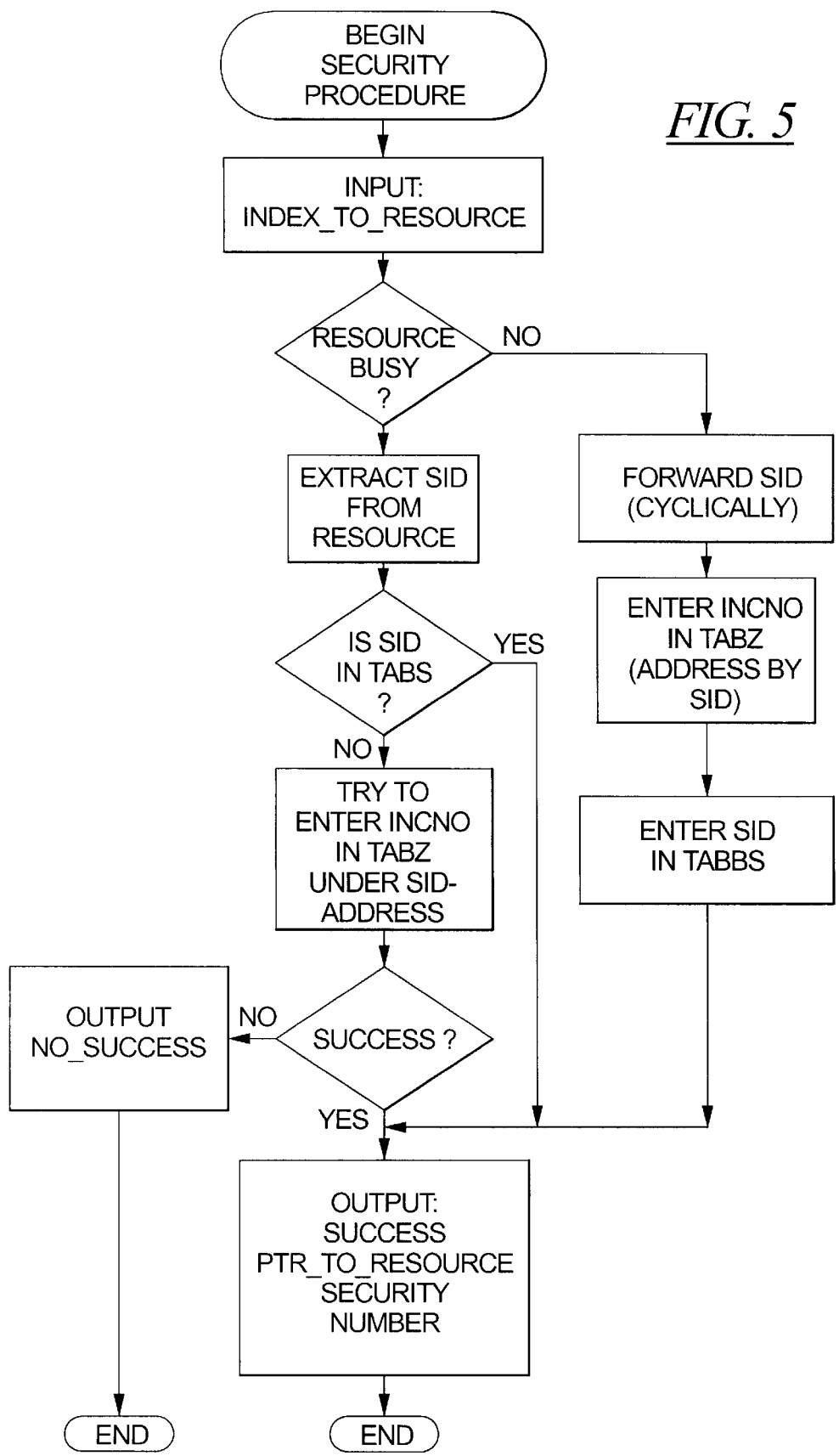
FIG. 5 is a flowchart depicting the steps of the mehtod of the present invention.

The functioning of the central procedures for securing and unsecuring the resources shall be set forth in greater detail below and is depicted in FIGS. 4 and 5.

In the course of a message processing, a user requests indicates a need to access a channel register CHR and calls the security procedure for securing channel registers for this purpose. In its call, the user request gives the security procedure an index to the requested channel register, whereby the user request has taken the index from the received message. With reference to this index, the security procedure checks whether the requested channel register is in the status "channel busy" or "channel free".

When the channel register is in the "channel busy" status, than the security procedure takes the security number appertaining thereto from the channel register. The security procedure then attempts to enter the identification number of the user request in the central security table under this security number. When this is successfully carried out, then the user request receives the returned parameter "success" as well as a physical pointer to the requested channel register. Due to the successful deposit, the user request simultaneously has control over the entire resource configuration belonging to the security number of the requested channel register.

When the channel register CHR is in the "channel free" status, the security procedure (after being requested to do so by the point of administration) enters a new security number in the channel register or, respectively, enters the current security number in the channel register in case it is already present in the local security number table TABS. The current security number is the security number SID-1 entered at the first location in the local security number table.

When the channel register has a reference to a partner having the same security number, the security procedure returns both pointers to the calling user request. When they are different, the call is rejected with a corresponding return parameter. The described operation of the security procedure for securing channel registers applies analogously to the security procedure for securing transaction control blocks.

The unsecuring procedure is called in by a central service request of the user at the end of a message processing. The unsecuring procedure operates with the assistance of the channel register table TAB shown in FIG. 3 or by entering all pointers to channel registers that were delivered to a user request during the course of a message processing. All channel registers belonging to this channel pointer table are checked for the "channel free" status by the unsecuring procedure. By entering this status in a channel register, a user request determines whether the channel register can be released at this location. When this applies, the channel register at this location is entered in the free resource pool by calling in the corresponding routine.

The described unsecuring procedure is also accepted for the transaction control blocks analogous to the channel register. This means that the unsecuring procedure also correspondingly processes a transaction pointer table TABT in addition to the channel pointer table.

Those security numbers that have been secured by a processor during the course of a message processing are stored in the local security number table. After the conclusion of the message processing, all corresponding security numbers are in turn unsecured in the central security table with the assistance of this table and are thus released for another securing by other processors.

Due to the above-described functioning of the securing procedures, the message-associated user request notices virtually nothing of the actual securing event. The event of unsecuring after the message processing is also sequenced by a central service request of the user.

The most important executions or, respectively, definitions of the described coordination method are again summarized as follows. A user request receives the pointer to a resource from the securing procedure only when the resource contains a security number and this security number has been properly secured by depositing the processor number. No security numbers are cyclically allocated, that is it can definitely occur that two resource configurations that are independent of one another have the same security number. The first security number that is secured by a processor is a "current security number". The current security number is entered given a new seizure of a resource. A new security number is allocated only in case a security number is not yet present, this then becoming the new, current security number and being entered into the newly seized resource. All security numbers SID-1 . . . SIDn that have been secured during the course of a message processing are entered in the local, processor-associated security number table TABS. As already mentioned, the current security number resides at the first location in this table. This current security number is co-transmitter to a central service request (for example, securing procedure, unsecuring procedure, linkage procedure) at every call of a user request.

When two resource configurations are linked to one another, all resources must have the same security number after the linking. This is assured by the call-in of a central service request, namely, of the aforementioned linkage procedure.

All pointers to channel registers or, respectively, transaction control blocks that are forwarded to the user requests via the securing procedure during the course of a message processing are entered in the channel pointer table or, respectively, transaction pointer table.

By entering the "free" status, a user request indicates that this resource can be released. Entering the released resource into the free resource pool, as well as the unsecuring of the security number in the central security table TABZ likewise ensue with a central service request, namely the unsecuring procedure. All security numbers that had been secured during the course of a message processing are centrally unsecured with the unsecuring procedure. When inconsistencies in the linkage of the resources or of the security numbers are discovered when securing resources, these are corrected insofar as possible by the securing procedure.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A method for coordination of parallel accesses of a plurality of processors to resource configurations that have resources, comprising the steps of:

securing each resource by a security number from the plurality of security numbers, resources that belong to a common resource configuration having a common security number, security numbers of the plurality of security numbers being forwarded to the resources via a central security table; and assigning access control over an entire respective resource configuration on demand to a requesting processor, when a respective security number belonging to the respective resource configuration has not been seized at this point in time by a different processor.

2. The method according to claim 1, wherein existing security numbers are cyclically forwarded.

3. A method for securing resource configurations against parallel accesses of a plurality of processes or processors, comprising the steps of:

protecting each resource by a security number from a plurality of security numbers, the security numbers being forwarded to the resources and resources belonging to a common resource configuration receiving the same security number;

upon demand of a respective resource by a respective process or processor, seizing a security number of a respective resource for a respective processor, as a result whereof an entire resource configuration to which the respective resource belongs is protected against parallel accesses by other processors.

4. The method according to claim 3, wherein a security number of a respective resource is seized in that a number of a demanding process or processor is entered into a central security table, whereby the table location is addressed by the security number.

5. The method according to claim 4, wherein the security numbers are addresses of the central security table, and wherein the security numbers are cyclically forwarded.

6. A method for coordination of parallel accesses of a plurality of processors to resource configurations that have resources, comprising the steps of:

providing a plurality of security numbers and a plurality of resources;

securing each resource of the plurality of resources by a security number from the plurality of security numbers, resources that belong to a common resource configuration having a common security number;

cyclically forwarding to the resources security numbers via a central security table;

assigning access control over an entire respective resource configuration on demand to a requesting processor, when a respective security number belonging to the respective resource configuration has not been seized at this point in time by a different processor.

* * * * *